Patented Mar. 16, 1954

2,672,439

UNITED STATES PATENT OFFICE 2,672,439

HYDROBROMINATION OF OLEFINIC COMPOUNDS BY ELECTRICAL DISCHARGE

Herman Johannes den Hertog and Pieter Bruin, Amsterdam, Netherlands, assignors to Shell Development Company, San Francisco, Calif., a corporation of Delaware No Drawing. Application September 22, 1950, Serial No. 186,302

Claims priority, application Netherlands September 30, 1949

10 Claims. (Cl. 204—169)

This invention relates to a process for preparing bromine-containing compounds by the hydrobromination of organic compounds containing one or more aliphatic multiple bonds. In particular, the method is one whereby "abnormal" addition of hydrogen bromide to the unsaturated reactant is obtained by conducting the reaction under the influence of silent electric discharges.

It has long been known that hydrogen halides may be added to unsaturated hydrocarbons and to various unsaturated derivatives thereof, Markownikoff stating, in 1870, that "if an unsymmetrical hydrocarbon combines with a halogen acid, the halogen adds to the carbon atom with fewer hydrogen atoms, i. e. to the carbon atom which is more under the influence of other carbon atoms." The same investigator further determined that when a hydrogen halide is added to a halogenated unsaturated compound such as vinyl chloride or a chlorinated propylene (i. e. to unsaturated hydrocarbons wherein one of the unsaturated carbon atoms carries a halogen atom, or wherein these unsaturated carbon atoms contain dissimilar numbers of halogen atoms directly attached thereto), the halogen atom of the hydrogen halide will add to the double bonded (unsaturated) carbon atom which carries the greater number of halogen atoms, while the hydrogen atom of the hydrogen halide molecule attaches to the adjacent unsaturated carbon atom. The above type of hydrohalogenation is termed "normal" to distinguish it from the "abnormal" addition which takes place when the hydrogen and halogen atoms are added in positions which are interchanged with respect to addition according to the above-outlined Markownikoff rule.

The compounds produced as a result of the abnormal addition of hydrogen bromide to aliphatically unsaturated compounds often possess greater utility for a variety of purposes than do the corresponding compounds produced when the addition takes place in the normal manner. This is particularly the case when dealing with terminally unsaturated compounds. Accordingly, a variety of methods have been proposed for so controlling the reaction that the abnormal hydrobromination will at least predominate. Many of the methods hitherto proposed for this purpose suffer disadvantages of one type or another, and it is an object of the present invention to provide a process whereby aliphatically unsaturated compounds may be subjected to abnormal hydrobromination in a new and efficient manner.

A more particular object is to provide a method of this character wherein the proportion of bromine-containing product formed as a result of normal addition of the hydrogen bromide is either eliminated or reduced to small proportions.

It is our discovery that the foregoing objects are achieved when hydrogen bromide is reacted with aliphatically unsaturated organic compounds under the influence of silent electric discharges. When the reaction is carried out under these conditions the abnormal addition is strongly promoted and the resulting product is found to consist substantially, or even entirely, of the abnormal HBr-addition product. Thus, in the case of a 1-alkene reactant, the product is a 1-bromoalkane.

The aliphatically unsaturated organic compounds which may be treated according to the process of this invention are those which contain at least three carbon atoms and possess one or more olefinic linkages in asymmetrical position within the molecule. Representative hydrocarbons falling into this class are propylene, 1 - butene, 1 - pentene, 2 - pentene, 1 - hexene, 4 - methyl - 1 - pentene, 4,4-dimethyl-1-pentene, 4-methyl-2-pentene, 1-octene, 1-decene, styrene, cyclohexene, 3-4-dimethylcyclohexene, 1,4 - diphenyl-2-butene, 1 - hexadecene, 1 - octadecene, 2-octadecene, 1-eicosene, 1-docosene, 1-pentacosene, 1,3-butadiene, 1,3-pentadiene, 1,4-pentadiene, 1,5-hexadiene, and the like. The above compounds, and their various homologues, may be substituted in a varying degree and still be suitable for use as reactants in the process of the present invention. For instance, the unsaturated reactant may contain one or more halogen atoms attached to saturated and/or unsaturated carbon atoms, representative reactants of this variety being allyl chloride, crotyl chloride, methallyl chloride, allyl bromide, and the like. Other examples of substituted, unsaturated reactants are methyl acrylate, methyl methacrylate, divinyl ether, diallyl ether and dimethallyl ether. A preferred class of unsaturated reactant compounds is made up of the alkenes containing at least three carbon atoms in the molecule, while a still more preferred class of reactant compounds comprises the alkenes of this variety which contain a terminal double bond, as represented by propene, 1 - butene, 1 - pentene, 1 - hexene, 1 - octene, 1 - decene, 1 - dodecene, 1-pentadecene, 1-octadecene, and 1-eicosene, for example.

Instead of using pure compounds as the unsaturated reactants there may be employed mixtures of various aliphatically unsaturated compounds. A representative reactant mixture of this type is made up of the monoalkenes containing, in general, from about 10 to 25 carbon atoms which is derived on the cracking of paraffin wax. Preferred wax olefin mixtures of this character, for purposes of the present invention, contain from about 10 to 18 carbon atoms.

In addition to their content of unsaturated compounds, such mixtures may also contain other compounds such as the alkanes, for example.

As regards the proportions of the unsaturated and hydrogen bromide reactants, good results are obtained when only the theoretically required amounts of hydrogen bromide are used. Preferably, however, there is employed an excess, as up to approximately 50%, of the hydrogen bromide reactant, as it is then often possible to obtain higher yields. On the other hand, the use of a greater excess of hydrogen bromide is to be avoided since in many cases the occurrence of undesirable side reactions is then favored.

It has been noted above that the process of the present invention takes place only under the influence of silent electric discharges, electrical treatments of this variety being also known in the art as "voltolization." In general, the voltolization conditions employed in other processes may also be employed in the present invention. Thus, one may use an alternating current of from about 50 to 1,000 cycles, and voltages of from about 5,000 to 25,000 volts, though voltages as high as 50,000 volts can also be utilized. The voltolization unit usually consists of a condenser type apparatus, with the discharge taking place in the space between the two insulated electrodes through which the reaction mixture is circulated.

The process of this invention can be carried out in either the liquid or the gaseous phase, though the latter is preferred. In either case, there may be employed a considerable range of reaction temperatures and pressures. Thus, while the reaction is generally conducted at ambient or only slightly raised temperatures (i. e. at from about 20 to 50° C.) and under prevailing atmospheric pressures, higher or lower temperatures and pressures can also be used. In some cases, as with propene, for example, the yield of the desired abnormal, HBr-addition product is decreased by working at higher temperatures, as between 50 and 150° C., though the use of temperatures above 150° C. is to be avoided as a rule on account of the increasing amounts of undesirable, high-boiling by-products which are formed at such temperatures.

The reaction of this invention may take place in either the presence or absence of diluents such as nitrogen, paraffinic hydrocarbons, or other gases which are inert under the reaction conditions employed. Again, while the process may be conducted in either a continuous or a discontinuous manner, there are preferably employed continuous processes in which the reactant mixture is conducted uninterruptedly through an ozonizer or other voltolization instrument wherein the reaction mixture is subject to the influence of silent electric discharges, and from which the resulting reaction mixture is continuously discharged.

The speed of the present HBr-addition reaction varies from one reactant to another as well as with varying voltolization conditions. Thus, under otherwise identical conditions, the speed of the reaction increases with a rise in voltage of the electric discharge device, while the speed diminishes as the distance separating the surfaces between which the electric discharges take place, becomes greater. Accordingly, with apparatus wherein the distance in question does not exceed from about 1 to 2 mm. good results are obtained using about 10,000 volts, though when apparatus is used in which this distance becomes more than 2 mm., it becomes necessary to use higher voltages, as 20,000 volts or more in order to attain the same speed of reaction.

Whatever the speed of reaction, it is important that the reaction time (i. e., the time during which the reaction mixture is exposed to the silent electric discharges) be relatively short, viz., not more than about 15 minutes. If longer periods are employed, undesirable by-products are formed in increasingly large amounts, and this is to be avoided whenever possible. It has been found that reaction periods of less than a minute, as, for example, from 0.1 to 0.5 minute, will usually suffice.

The working-up of the reaction mixture obtained can take place in any suitable way. Thus, for example, after any excess of hydrogen bromide has been removed by washing with water, the reaction mixture can be subjected to fractional distillation, whereby the desired bromine-containing product is isolated from any unconverted part of the unsaturated reactant and from the higher boiling by-products which may have formed in small quantities. The unsaturated reactant so recovered can be used again in the process.

The organic bromine compounds prepared by means of the process according to the invention are valuable products, which can, for example, be used as solvents, but which are more particularly of importance as intermediate products for the preparation of other valuable substances. Thus, for example, the primary alkyl bromides obtained from alkenes with a terminal double bond can be converted into other alkyl compounds with a terminal functional group, such as alcohols, rhodanides, sulphuric acid ester salts, carboxylic acids, carboxylic acid esters, amines and the like.

While the invention has been described above as it relates to the hydrobromination of unsaturated compounds containing an unsaturated linkage in an asymmetrical position within the molecule, it has also been found that the process of the invention may be utilized to good advantage in the hydrobromination of such compounds as ethylene and 2-butene for example, wherein the unsaturated linkage is not so positioned. While in such cases there is presented no alternative of abnormal or normal addition, nevertheless the customary hydrobromination reaction is speeded up and is made more complete when the reactants are subjected to silent electric discharges in the manner described herein. This feature of the invention is particularly illustrated in Example I below.

The present invention is illustrated in various of its embodiments by the following examples.

*Example I*

A mixture of two parts by volume of ethene and three parts by volume of dry hydrogen bromide gas was fed at a rate of 300 cc. per minute into a Siemens-type glass ozonizer which was kept at 20° C. and in which the distance between the inner and outer tubes was 2.5 mm. and wherein the volume of the discharge space was about 150 cc. In the ozonizer the reaction mixture was exposed to silent electric discharges with a potential difference of 20,000 volts, the current having a frequency of 50 cycles per second. The reaction product formed was collected in a liquid state in a vessel fixed underneath the ozonizer and connected with a washing bottle and a condensation vessel cooled to —80° C. After 1.8 liters of ethene (1 atm.; 20° C.) had been passed through in 15 minutes, the experiment wis discontinued. By then a total of 7.5 g. of liquid reaction product had formed. After being washed with water and dried on calcium chloride, the reaction product was subjected to fractional distillation, whereby 6.5 g. of bromoethane was recovered and about 1 g. of residue was obtained. The conversion into bromo-ethane, therefore, was 80%, referred to ethene, whilst only a small quantity of higher boiling by-products had formed during the reaction.

Example II

A mixture of two parts by volume of propene and three parts by volume of dry hydrogen bromide gas was treated in the same apparatus and under the same circumstances as described in Example I, but now the condensation vessel was cooled down to only —35° C. After 3.6 liters of propene (1 atm.; 20° C.) had been passed through in 30 minutes, a total quantity of 19 g. of liquid reaction product had formed. This liquid, after being washed with water and being dried on calcium chloride, was subjected to fractional distillation, whereby about 18 g. of 1-bromopropane was obtained, which corresponds to a conversion of nearly 98%, referred to propene.

Example III

A mixture of two parts by volume of 1-butene and three parts by volume of dry hydrogen bromide gas was fed through a Siemens-type ozonizer kept at 20° C., in which the distance between the walls was 0.75 mm. and the volume of the discharge space was 20 cc., at a rate of 200 cc. per minute. In the ozonizer the reaction mixture was exposed to the influence of silent electric discharges with a potential difference of 10,000 volts and a frequency of 50 cycles per second. After 15 minutes had elapsed, in which time 1.2 liters of 1-butene (1 atm.; 20° C.) had been introduced, 7.5 g. of an oily product had accumulated in the receiver beneath the ozonizer. After being washed with water and dried with calcium chloride, approximately 7 g. of 1-bromobutane was recovered from this oil by distillation, which proves that the 1-butene had been converted practically quantitatively into the desired 1-bromoalkane product.

Example IV 1-hexene was added drop by drop to a current of dry hydrogen bromide gas and the resulting vaporous mixture, in which the molecular ratio of 1-hexene to HBr was 1:1.5, was then exposed in the same ozonizer and under the same conditions as described in Example III to the influence of silent electric discharges. In 45 minutes 12.6 g. of 1-hexene (=0.15 mol.) had been introduced and 23.7 g. of oil had then accumulated in the receiver beneath the ozonizer. This oil was washed with water, dried on calcium chloride, and then subjected to fractional distillation. The product distilling over between 151° C. and 153.5° C., viz. a quantity of 17 g., consisted of almost pure 1-bromo-hexane. Consequently, referred to 1-hexene, the conversion was approximately 68%.

Example V

The operation of Example IV is repeated using a Stanlow cracked wax olefin mixture instead of the 1-hexene reactant. The wax olefin mixture here employed is one which contains from about 10 to 18 carbon atoms in the molecules of its respective components, and which has an average molecular weight of about 185. The various olefins in the mixture contain substantially only terminal double bonds, and the mixture as a whole contains about 0.9 double bond per molecule, on the average. In this case it is found that approximately 70% of the wax olefin mixture passed through the ozonizer adds abnormally to the hydrogen bromide.

The invention claimed is:

1. In a process for hydrobrominating an olefinic compound containing at least one olefinic linkage of aliphatic character, the step comprising reacting hydrogen bromide and said organic compound under the influence of silent electric discharges for a period of not more than 15 minutes, whereby abnormal addition of hydrogen bromide to said olefinic compound takes place and a hydrogen bromide addition product having the same number of carbon atoms as said starting olefinic compound is produced as the predominant product.

2. The method of claim 1 wherein the organic reactant compound is ethylene.

3. In a process for effecting abnormal addition of hydrogen bromide to an organic compound containing at least 3 carbon atoms and having an olefinic linkage of aliphatic character in asymmetrical position in the molecule, the step comprising reacting hydrogen bromide and said organic compound under the influence of silent electric discharges for a period of not more than 15 minutes, whereby hydrogen bromide addition product having the same number of carbon atoms as the starting olefinic compound is produced as the predominant product.

4. In a process for effecting abnormal addition of hydrogen bromide to a mono-olefinic hydrocarbon containing at least 3 carbon atoms and having the olefinic linkage in asymmetrical position in the molecule, the step comprising reacting hydrogen bromide and said mono-olefinic hydrocarbon under the influence of silent electric discharges for a period of not more than about 15 minutes, whereby addition of the hydrogen bromide to the double bond takes place with formation of the corresponding monobromo hydrocarbon of the same number of carbon atoms as the starting olefinic hydrocarbon.

5. In a process for preparing primary alkyl bromides, the step comprising reacting hydrogen bromide with an alkene having a terminal olefinic linkage under the influence of silent electric discharges for a period of not more than 15 minutes, whereby a hydrogen bromide addition product having the same number of carbon atoms as said alkene is produced as the predominant product.

6. The process of claim 5 wherein there is employed from 1 to 1.5 moles of hydrogen bromide per mole of the alkene reactant, and wherein the reaction mixture is maintained under the influence of the silent electric discharges for a period of from 0.1 to about 0.5 minute.

7. A process wherein hydrogen bromide is reacted with a wax olefin mixture under the influence of silent electric discharges for a period of not more than 15 minutes, whereby abnormal addition of hydrogen bromide to the double bond of said olefin with formation of the corresponding monobromoparaffin takes place as the predominant reaction.

8. In a process for preparing 1-bromopropane, the step comprising reacting 1-propene and hydrogen bromide under the influence of silent electric discharges for a period of not more than 15 minutes.

9. In a process for preparing 1-bromobutane, the step comprising reacting 1-butene with hydrogen bromide under the influence of silent electric discharges for a period of not more than 15 minutes.

10. In a process for preparing 1-bromohexane, the step comprising reacting 1-hexene with hydrogen bromide under the influence of silent electric discharges for a period of not more than 15 minutes.

HERMAN JOHANNES DEN HERTOG.
PIETER BRUIN.

References Cited in the file of this patent

UNITED STATES PATENTS

| Number | Name | Date |
|---|---|---|
| 1,012,149 | Pfeifer et al. | Dec. 19, 1911 |
| 1,710,155 | Egloff et al. | Apr. 23, 1929 |
| 2,307,552 | Vaughan et al. | Jan. 5, 1943 |
| 2,376,675 | Evans et al. | May 22, 1945 |
| 2,398,481 | Vaughan et al. | Apr. 16, 1946 |

OTHER REFERENCES

Balandin et al., Chemical Abstracts, vol. 34 (1940), p. 7757.

Glockler et al., Electrochemistry of Gases (1939), p. 201.

Glockler et al., Transactions Electrochemical Society, vol. 88 (1945), pp. 63–72.